UNITED STATES PATENT OFFICE.

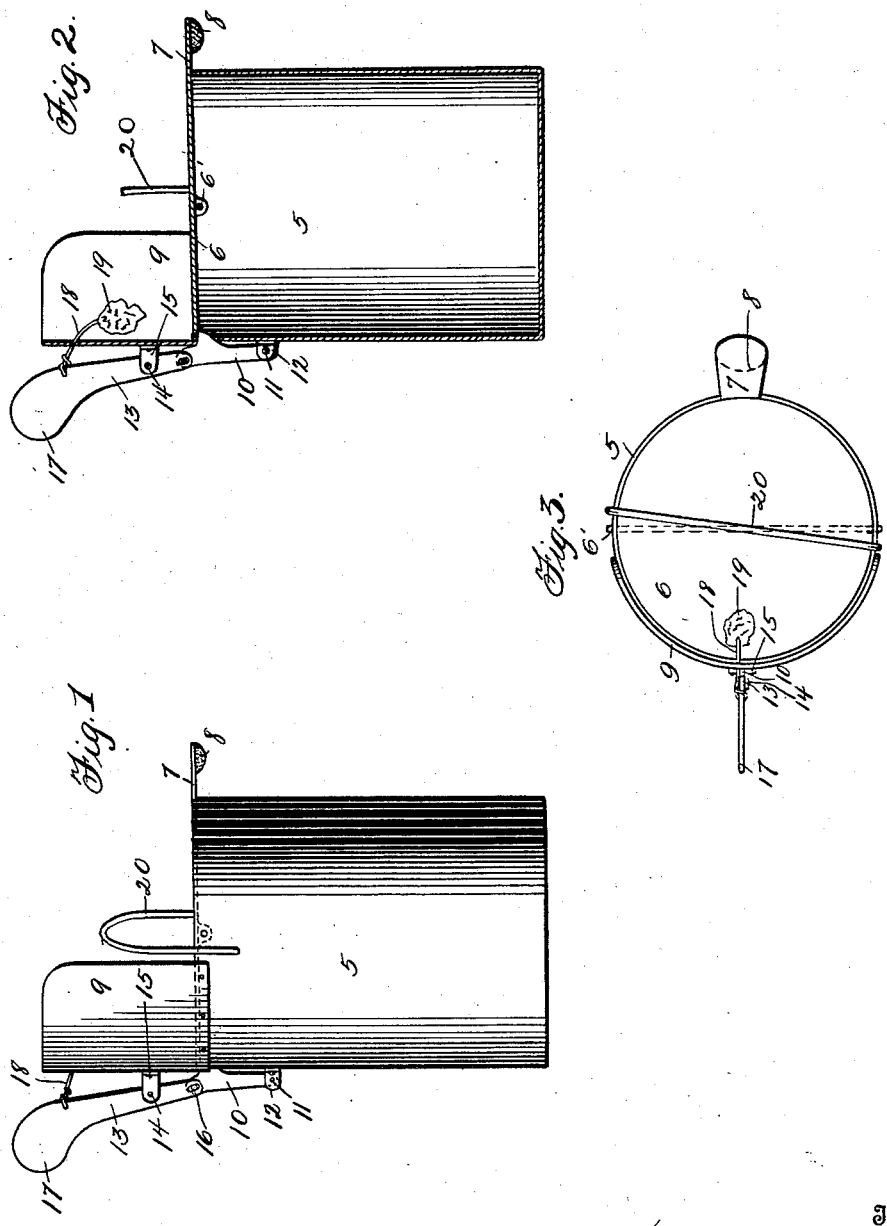

HENRY F. COLEMAN, OF SNEEDSVILLE, TENNESSEE.

ANIMAL-TRAP.

1,073,094. Specification of Letters Patent. Patented Sept. 16, 1913.

Application filed January 18, 1913. Serial No. 742,959.

*To all whom it may concern:*

Be it known that I, HENRY F. COLEMAN, a citizen of the United States of America, residing at Sneedsville, in the county of Hancock and State of Tennessee, have invented certain new and useful Improvements in Animal-Traps, of which the following is a specification.

This invention relates to animal traps adapted to trap various kinds of small animals but particularly adapted to trap and destroy rats, mice and like destructive rodents.

The object of the invention is to provide an improved trap of the character above set forth provided with a tilting trap door and with improved means for controlling the movement of said trap door and for locking the same.

A further object of the invention is the provision of a shield adjacent the bait which shield serves a purpose hereinafter described.

Further objects and advantages of the invention will be set forth in the detailed description which now follows.

In the accompanying drawing, Figure 1 is a side elevation of an animal trap constructed in accordance with the invention, Fig. 2 is a vertical sectional view thereof, and, Fig. 3 is a plan view.

Like numerals designate corresponding parts in all of the figures of the drawing.

Referring to the drawing, 5 designates a receptacle adapted to contain water or other liquid in which the animals trapped are to be drowned, or otherwise suffocated. The receptacle 5 is provided with a cover consisting of a tilting trap door 6 which is provided with an extension 7 carrying a counterweight 8. An upstanding hood 9 is secured to the body 5 and extends part way around said body. The trap door 6 is normally held against movement by a trigger 10 which underlies its rear edge and is pivoted at 11 to a bracket 12. A lever 13 is pivoted at 14 within a bracket 15 and is pivoted at 16 to the upper end of trigger 10. Lever 13 has a rearwardly projecting enlargement 17 which acts as a weight to normally throw the upper end of the lever 13 away from the hood and consequently move the trigger into position to engage beneath the trap door 6. A wire, cord or other connection 18 is secured to the lever 13 and passes through hood 9. A bait, indicated at 19, when drawn upon by the animal, acts, through the medium of connection 18, to draw the upper end of lever 13 toward the hood and consequently to move the trigger from beneath the rear edge of the trap door, whereupon the weight of the animal causes the trap door to tilt and precipitate the animal into the interior of the receptacle 5 where it is drowned. As soon as the weight of the animal is removed from the trap door, the counterweight 8 acts to cause the trap door to close, whereupon the weighted portion 17 of lever 13 causes the trigger to again engage beneath the trap door and lock the same in its closed position.

By virtue of this construction, there is no likelihood that the animal in its struggles, will be able to move the trap door to its open position and escape.

A bail 20 provides means for transporting the trap to any desired location and serves the more important function of preventing the trap door from turning wrong side up. It does this by virtue of the fact that it prevents the weight 8 from passing over the center, or to the left of the pivotal mounting 6' in Fig. 2. The bail is disposed at an angle to the pivot rod 6' of the trap door by virtue of which construction the bail lies in position to limit the movement of said trap door, but at the same time engages the body 5 at diametrically opposed points so that said body will be evenly balanced when lifted by said bail.

It is to be noted that the peculiar arrangement of levers 10 and 13 provides a toggle connection whereby a very slight pull upon the bait will move the trigger and whereby the weight 17 will very effectually keep the trigger in normally operative position. The shield 9 while providing a mounting for lever 19 and concealing the movable portions of the mechanism from the animal, serves also the function of giving the animal a feeling of security that will cause it to readily approach the rear edge of the trap door. The receptacle 5 may be of any size or shape, or may be of any desired material and made sufficiently large to hold a considerable number of the animals trapped.

The trap herein shown and described may be used to catch rats, mice, squirrels, gophers, prairie dogs, minks, weasels, muskrats, rabbits, skunks, possums, ground-hogs, coons, foxes and various other small animals.

While the elements shown and described are well adapted to serve the purposes for which they are intended it is to be understood that the invention is not limited to the precise construction set forth, but includes within its purview such changes as may be made within the scope of the appended claims.

Having described my invention, what I claim is:

1. In a device of the character described, the combination with a receptacle, of a pivoted trap door forming a closure for said receptacle, a counterweight carried by said trap door, a trigger normally holding said trap door in its closed position and adapted to engage and lock said trap door when said trap door is returned to a closed position by the action of said weight, and a bail arranged to serve the double function of providing a carrying element for the receptacle and of limiting the movement of said trap door.

2. In a device of the character described, the combination with a receptacle, of a pivoted counterweighted trap door forming a closure for said receptacle, an upstanding hood extending partly around said receptacle, a trigger adapted to engage said trap door, said trigger being pivoted to said receptacle, a lever pivoted intermediate its ends to said hood, means for pivotally connecting said lever to said trigger to form a toggle, and a bail engaged with the sides of and extending across said receptacle in front of said hood in such position as to serve the double function of providing a carrying element for said receptacle and limiting the opening movement of said trap door.

3. In a device of the character described, the combination with a receptacle, of a pivoted trap door forming a closure for said receptacle and arranged to have its rear edge tilt downwardly within the body of the receptacle, the forward edge of said trap door being provided with an extension overhanging the front wall of the receptacle, a counterweight carried by said overhanging portion, and an arched bail engaged with the side walls of the receptacle and extending transversely thereacross, a portion of said bail lying in front of the pivot of the trap door and a portion of said bail lying in the rear thereof, said bail serving the double function of providing a carrying element for the receptacle and preventing opening movement of said trap door beyond the center.

In testimony whereof I affix my signature in presence of two witnesses.

HENRY F. COLEMAN.

Witnesses:
 ROSA COLEMAN,
 G. M. GARLAND.